United States Patent [19]
Zwiercan et al.

[11] Patent Number: 4,608,265
[45] Date of Patent: * Aug. 26, 1986

[54] IMITATION CHEESE PRODUCTS CONTAINING HIGH AMYLOSE STARCH AS PARTIAL OR TOTAL CASEINATE REPLACEMENT

[75] Inventors: Gary A. Zwiercan, Knutsford, England; Norman L. Lacourse, Plainsboro; Julianne M. Lenchin, Cranbury, both of N.J.

[73] Assignee: National Starch and Chemical Corporation, Bridgewater, N.J.

[*] Notice: The portion of the term of this patent subsequent to Feb. 12, 2002 has been disclaimed.

[21] Appl. No.: 709,946

[22] Filed: Mar. 8, 1985

Related U.S. Application Data

[63] Continuation-in-part of Ser. No. 480,058, Mar. 29, 1983, abandoned.

[51] Int. Cl.$^4$ .............................................. A23C 20/00
[52] U.S. Cl. .................................... 426/582; 426/661
[58] Field of Search ................ 426/582, 661, 104, 657

[56] References Cited

U.S. PATENT DOCUMENTS

| | | | |
|---|---|---|---|
| 3,741,774 | 6/1973 | Burkwall | 426/582 |
| 3,917,873 | 11/1975 | Kuroda et al. | 426/568 |
| 3,922,374 | 11/1975 | Bell et al. | 426/582 |
| 4,045,589 | 8/1977 | Petrowski et al. | 426/609 |
| 4,075,360 | 2/1978 | Rule et al. | 426/582 |
| 4,104,413 | 8/1978 | Wynn et al. | 426/582 |
| 4,159,982 | 7/1979 | Hermansson | 260/119 |
| 4,251,556 | 2/1981 | Burkwall, Jr. et al. | 426/332 |
| 4,349,577 | 9/1982 | Tessler | 426/590 |
| 4,369,196 | 1/1983 | Sukegawa | 426/104 |
| 4,499,116 | 2/1985 | Zwiercan et al. | 426/582 |

OTHER PUBLICATIONS

G. Downey & K. J. Burgess "Modification of the Aqueous Solubility of Edible Fibers Composed of Casein and Carrageenan", 1979, I. J. Food Sc. Technol. 3, #1, pp. 33–42, (CA93 24650n).

Nahrung 21 #7, p. 617, (CA88 36051y.) H. Schmandke & G. Muschiolik, "The Effect of Dialdehyde Starch on the Rehydration of Textured Protein", 1977.

Primary Examiner—Arthur L. Corbin
Attorney, Agent, or Firm—Edwin M. Szala; Margaret B. Kelley

[57] ABSTRACT

An imitation cheese product which is functionally equivalent to a caseinate-based imitation cheese product, contains pregelatinized modified high amylose starches, preferably converted and/or derivatized, as partial or total replacement for the caseinate present in the cheese. Suitable converted starches include fluidity starches prepared by acid- or enzyme-conversion, oxidized starch prepared by treatment with less than 5% active chlorine, and dextrins having a calcium chloride water fluidity of less than about 50. Suitable derivatives are prepared by treatment with up to 25% propylene oxide, 5% succinic anhydride, and 10% octenylsuccinic anhydride or with a sufficient amount of acetic anhydride or sodium or potassium ortho or tripolyphosphate to provide a maximum of 6% bound acetyl or 0.8% bound phosphate. Mixtures of modified or unmodified high amylose starches with up to 80% by weight of other starches (0–40% amylose) are also suitable. In a preferred embodiment, the cheese is an imitation mozzarella cheese substantially equivalent to the caseinate-based imitation cheese in all properties.

23 Claims, No Drawings

IMITATION CHEESE PRODUCTS CONTAINING HIGH AMYLOSE STARCH AS PARTIAL OR TOTAL CASEINATE REPLACEMENT

This application is a continuation-in-part of Ser. No. 480,058, filed Mar. 29, 1983, now abandoned.

BACKGROUND OF THE INVENTION

This invention relates to imitation cheese products, such as cheddar, processed American and especially mozzarella cheeses, wherein the caseinates are partially or totally replaced by pregelatinized high amylose starches.

Early attempts to reduce cheese costs led to the development of cheese analogs in which vegetable fat replaced the more costly milk fat. Such analogs were usually manfactured by traditional methods from skim milk containing dispersed vegetable fats and were generally referred to as "filled" cheeses.

Later economic incentives and technical advances led to the development of fabricated cheese analogs manufactured fundamentally from casein or its derivatives, vegetable fats or oils, salts, acids, and flavorings. Since casein derivatives are legally defined as nondairy ingredients, the fabricated analogs were referred to as "imitation" cheeses.

Imitation cheese products include very high-moisture content cheeses such as cream cheese; high moisture content cheeses such as blue cheese and mozzarella, the latter accounting for a major portion of the casein-based imitation cheese market; medium-moisture cheeses, such as cheddar and provolone; low-moisture cheeses, such as romano and parmesan; and pasteurized processed cheeses such as American cheese, cheese spreads and cheese products. These imitation cheese products provide the flavor and functionality of natural cheese at a reduced cost and, in addition, are lower both in calories and cholesterol since the animal fat has been replaced by vegetable fat.

Sodium, potassium, and calcium caseinates, as well as those salts generated in situ by treating acid casein and rennet casein with the appropriate alkali, are used in the preparation of imitation cheese products. Besides providing a major protein source, the caseinates, alone or in combination, possess unique setting, textural and emulsification properties that make them ideal, and their moderately low viscosity permits their use at high solids.

The current high cost and uncertain future availability of casein and caseinates have become a major concern to food processors. For these reasons, the processors have been trying to find a readily available caseinate substitute, preferably a low cost substitute, to partially or totally replace the caseinates in imitation cheese products. Some attempts have been made to utilize dry vegetable protein isolates (e.g. soy isolates) as replacements. The isolates lack the functionality of the caseinates and have generally only been useful as extenders. The isolates have to be specially treated to provide cheeses with sufficient melt (see U.S. Pat. No. 4,349,576 issued Sept. 14, 1982 to W. F. Lehnhardt et al.) and even then severe shearing during the cheese preparation will substantially reduce the melt value. A recent article in Food Processing (October 1981, pp. 28–29) discloses that a protein mixture (25% casein, 25% soy flour, 25% wheat gluten, and 25% alfalfa protein) is being used with some success in imitation mozzarella cheese; however, the final product does not provide "all desirable characteristics, including flavor".

Thus, there is still a need for a readily available caseinate replacement which will provide the gelling and emulsion-stabilizing properties required during the cheese preparation and which will still provide cheese products having a desirable flavor and textural properties (i.e., especially gel, melt, and shredding and slicing characteristics) comparable to the caseinate-based imitation cheeses.

Flours and starches have been used in various cheese products as thickeners and/or binders as well as to improve specific properties. They have not, however, been used as caseinate replacements to provide the properties typically supplied by the casinates.

In natural cheese products, for example, cyclodextrin has been added to increase moisture retention and storage life (JaP. Kokai Tokyo Koho 81 No. 75,060); phosphorylated starch has been used as a thickener in blends of Cheshire and Emmenthal cheese to provide a nonstringy product (Fr. No. 1,570,860); aqueous corn starch mixtures (in place of the previously used milk or butter) have been blended with melted ripe cheese to give a stable soft food product having the consistency of butter (Fr. No. 1,566,665); starches have been used in processed cheese products prepared from natural cheese, milk powder and other ingredients (Food Engineering, November 1980, p. 25); and pregelatinized corn, potato and tapioca starches have been used as stabilizers (against the deleterious influences of freezing and thawing) in cheese cake and cheese pie fillings (U.S. Pat. No. 3,666,493 issued May 30, 1972 to J. A. Bluemake). In addition, potato starch (3–6%) has been used in admixture with a heated whey solution (65° C.) as a coating to improve the general appearance of hard cheeses (Pol. No. 54,548).

In cheese analogs and simulated cheese products, for example, corn starch hydrolysates (e.g., corn syrup) have been used to bind the water and prevent or retard its loss, as well as to add gloss, palatability, and body texture, to cheese foods based on vegetable oils, animal or vegetable proteins, and emulsifying metal salts (U.S. Pat. No. 3,310,406 issued Mar. 21, 1967 to D. A. Webster); ungelatinized flours (e.g., 3% tapioca flour) have been added, as optional ingredients (0–5%), to a caseinate-containing cheese substitute to aid in the firmness of the cheese substitutes resembling pasta filata or cheddar cheese (Austrian No. 335,830; Ger. Offen. 2,411,945; U.S. Pat. No. 3,922,374 issued Nov. 25, 1975 to R. J. Bell et al.; and U.S. Pat. No. 4,104,413 issued Aug 1, 1978 to J. D. Wynn et al.); flour and hydrogenated vegetable oils have been used as the matrix in intermediate moisture (about 12%), high flavor-impact cheese analogs containing dehydrated cheese and artificial flavorings (Food Product Development, June 1980, pp. 42–43) ; gelatinized high amylose starches and their derivatives have been used as binders for various edible protein pieces in integral simulated cheese products containing no fat (U.S. Pat. No. 3,836,677 issued Sept. 17, 1974 to J. A. Freck et al.); and starch (preferably corn starch) has been used with glucono-α-lactone as a cogulant in fresh cheese-like products prepared by heating a thermally coagulable protein (whey protein, liquid albumen, liquid whole egg, albumen powder, or whole egg powderl and whole and/or skimmed milk (see U.S. Pat. No. 4,369,196 issued Jan. 18, 1983 to Y. Sukegawa).

Pregelatinized starches (e.g., corn, wheat, waxy maize and tapioca) have been used in high protein extruded cheese products (U.S. Pat. No. 3,741,774 issued June 26, 1973 to M. P. Burkwall). These simulated cheese products are particularly suitable as a pet food or for human consumption because of their high protein content and shelf-stability (up to 6 months at room temperature). Unlike natural or imitation cheeses, they must include significant amounts of sugar and/or sugar equivalents which provide the requisite bacteriostatic effect. Also unlike natural or imitation cheeses they contain little or no edible fat or oil and, as a result, do not melt at about 93° C. (200° F.), a temperature at which most natural and imitation cheeses melt (see Col. 1, lines 47-50). The product can be extruded into small strands and compressed to give the "effect of cheese melted" on cooked hamburger or formed into small blocks to simulate conventional cheese. The components are about 1-25% cheese (more destroys the cohesiveness of the mixture), 5-35% of the sugar or sugar equivalents, 5-30% of any pregelatinized starch, 10-50% of a high protein binding agent (e.g., soy flour, casein, caseinate, and the like), and sufficient water to give a final moisture content of 20-40%, the percentages being by weight and totaling 100%. The use of from 1-7% by weight of an edible fat or oil is optional.

It is thus an object of the present invention to provide starches for use as partial or total caseinate replacements in imitation cheeses, especially mozzarella cheese.

SUMMARY OF THE INVENTION

The present invention provides an imitation cheese product containing at least one edible caseinate, wherein the improvement comprises the replacement of part or all of the caseinate with an edible pregelatinized modified starch having an amylose content of at least 40% (hereafter referred to as a high amylose starch). The modified high amylose starch is selected from the group consisting of a derivatized starch, a converted starch, a converted and derivatized starch, and a crosslinked starch. The high amylose converted starch is selected from the group consisting of a fluidity starch prepared by acid- or enzyme-conversion, an oxidized starch prepared by treatment with less than 5.5% active chlorine, and a dextrin having a calcium chloride water fluidity of less than 50. The modifications (i.e., conversion, oxidation, or dextrinization) are carried out on the pregelatinized high amylose starch or on the granular high amylose starch which is subsequently pregelatinized. The high amylose starch derivatives are prepared by treatment of the pregelatinized or granular high amylose starch with up to about 25% propylene oxide, up to about 5% succinic anhyride, up to about 10% octenylsuccinic anhydride, a sufficient amount of acetic anhydride to provide a maximum of about 6% bound acetyl, or a sufficient amount of sodium or potassium orthophosphate, sodium or potassium tripolyphosphate, or a mixture thereof to provide a maximum of about 0.8% bound (residual) phosphate, calculated as phosphorus. A modified or unmodified high amylose starch may be used in admixture with up to 80% by weight of an edible modified or unmodified pregelatinized starch having an amylose content of from 0% to less than 40% by weight (hereafter referred to as a low amylose starch). The modified low amylose starch is selected from the group consisting of a derivatized starch, a converted starch, a converted and derivatized starch, and a crosslinked starch, with the converted starches being selected from the group consisting of a fluidity starch, an oxidized starch, and a dextrin having an ABF value greater than 4. The modifications (i.e., derivatization, conversion, crosslinking, oxidation, or dextrinization) may be carried out on the pregelatinized low amylose starch or on the granular low amylose starch which is subsequently pregelatinized.

In a preferred embodiment it provides an imitation cheese product substantially equivalent to a caseinate-based imitation cheese product selected from the group consisting of mozzarella cheese, cheddar cheese, and processed American cheese, which comprises water, an edible vegetable fat or vegetable oil, cheese additives, and a gelling mixture of about 20-80% by weight of sodium and/or calcium caseinate and about 80-20% by weight of a pregelatinized converted and/or derivatized high amylose corn starch having an amylose content of about 50-70% by weight and selected from the group consisting of an acid-converted starch having a calcium chloride water fluidity of 40 or less, a derivatized starch prepared by treatment with about 3-6% octenylsuccinic anhydride, and a converted and derivatized starch having the above water fluidity and prepared by treatment with about 1-3% octenylsuccinic anhydride. Mixtures of the pregelatinized converted and/or derivatized high amylose starch (50-70% amylose) with the pregelatinized low amylose starch (0 to less than 40% amylose), e.g. a fluidity Amioca starch, may also be used provided the mixture contains about 30-70% by weight of the high amylose starch.

In another embodiment, it provides a caseinate-free imitation mozzarella cheese product functionally equivalent to a caseinate-based imitation mozzarella cheese product, which comprises water, an edible vegetable fat or oil, cheese additives, a pregelatinized converted and/or derivatized corn starch having an amylose content of about 50-70% by weight, the starch being selected from the group consisting of an acid-converted starch having a calcium chloride water fluidity of about 30-32 and the derivative thereof prepared by treatment with up to 0.75% octenylsuccinic anhydride.

It also provides a method for preparing an imitation cheese product from water, a melted vegetable fat or a vegetable oil, and cheese additives, characterized in that one of the edible pregelatinized modified high amylose starches or starch mixtures discussed hereinabove is added alone or together with an edible caseinate with the high amylose starch, starch mixture, or starch-caseinate mixture gelling and emulsion-stabilizing the water and melted fat or oil to form cheese product.

As used herein, the term "imitation cheese" is intended to refer to any cheese analog, capable of melting at the temperatures at which natural and imitation cheeses melt, which is typically prepared from water, vegetable fat(s) or vegetable oil(s), the starch(es) described herein, typical cheese additives such as natural and/or artificial flavorings, salts (sodium chloride and other salts), acids, colors, emulsifiers, stabilizers and preservatives, and optionally the edible caseinates and/or vegetable proteins typically present in the cheeses.

DESCRIPTION OF THE PREFERRED EMBODIMENTS

As used herein, suitable high amylose starches (40-100% amylose) include starches such as high amylose corn starches having amylose contents of about 40-80%, wrinkled pea starches having amylose contents of about 75–98%, and 100% amylose such as that extracted from potato starch. Suitabe low amylose starches (0% to less than 40% amylose), which are suitable for use in combination with the high amylose starches provided the mixtures contain at least 20%, preferably 30–70%, by weight of the high amylose starch, include starches such as corn, potato, sweet potato, wheat, rice, sago, tapioca, sorghum or the like having amylose contents of up to about 30%, starches such as smooth pea, Canadian pea, cocoa bean, winged bean, or the like having amylose contents of up to less than 40%, and starches such as waxy maize or waxy or gelatinous rice having amylose contents of from 0–6%.

All of the starches, including the converted and/or derivatized starches or the crosslinked products thereof, must be pregelatinized to be useful herein and to form a final cheese product having the desired textural properties. Pregelatinized starches are swellable in cold water without cooking. The starches may be pregelatinized by cooking the starch slurries (as in the Votator, tradename of Chemetron Corp. for a steam heated cooker) and then drum-drying or by jet-cooking the slurries and then spray-drying. The starches having an amylose content of 0% to below 40% may be pregelatinized by drum-drying without prior cooking; the high amylose starches (40%–100%) require cooking prior to drum-drying to fully cook the starch. The cooked starch can be dried by means other than spray-drying (i.e., freeze-drying, alcohol precipitation, rotary evaporation). Other means of carrying out the pregelatinization, such as extrusion, may also be useful herein. The jet-cooked starch dispersion, if desired, can be added directly to the cheese formulation.

Drum-drying is a conventional process for simultaneously cooking and drying starch slurries on heated drums and described in such articles as Chapter XXII—"Production and Use of Pregelatinized Starch", Starch: Chemistry and Technology, Vol. II—Industrial Aspects, R. L. Whistler and E. F. Paschall, Editors, Academic Press, New York 1967. Drum-dried starches are in the form of thin, solid sheets which are pulverized prior to use in the cheese formulation.

Jet-cooking and spray drying are conventional and described in patents such as U.S. Pat. No. 3,674,555 issued July 4, 1972 to G. R. Meyer et al. A starch slurry is pumped into a heated cooking chamber where pressurized steam is injected into the starch slurry. The cooked starch solution passes from the cooking chamber and exits via an exit pipe. The starch solution is atomized by pressurized spray nozzles or centrifugal wheel atomizers into a large, heated chamber where the water is evaporated. The starch passes through a cyclone to separate the heated air from the starch powder. The steam-injection, direct spray-drying process and apparatus described in U.S. Pat. No. 4,280,851 issued July 28, 1981 to E. Pitchon et al. for gelatinizing starch materials, especially high viscosity materials, in the atomized state is also useful herein.

Converted high-amylose corn starches are necessary to obtain a good melt when the starch is used at higher replacement levels. Conversion degrades the starch and reduces the viscosity of the cooked starch dispersions. It also improves the melt of the final cheese product. Suitable converted starches include acid- or enzyme-converted starches (often referred to as fluidity starches), oxidized starches (often referred to as chlorinated starches because of the reagent used in their preparation although no chlorine is chemically bound to the starch), and selected dextrins.

Dextrins, both high amylose and other dextrins, are suitable for use herein provided they are only mildly converted (i.e., have the indicated calcium chloride water fluidity or ABF value). Moderately and highly converted high amylose dextrins do not provide the required gel strength. Other dextrins which are moderately or highly converted are likewise not suitable; their blends with high amylose starches to provide starch mixtures having the required minimum amylose content are also not suitable. In addition, the more highly converted dextrins impart an objectionable flavor and adversely affect the color of cheeses such as mozzarella. The ABF value (anhydrous borax fluidity) is defined as the ratio of the amount of water to the amount of anhydrous dextrin when the latter is cooked for 5 minutes at 90° C. with 15% borax (on the weight of the dextrin), so as to provide a dispersion having a viscosity, when cooled to 25° C., of 70 cps. (see U.S. Pat. No. 3,445,838 issued Dec. 1, 1964 to R. B. Evans et al.). The calcium chloride water fluidity is described in Table I.

In the preparation of the converted starches by acid treatment, the granular starch base or derivatized starch base is hydrolyzed in the presence of an acid, such as sulfuric or hydrochloric acid, at a temperature below the gelatinization point of the starch. The starch is slurried in water, and the acid is then added. Typically, the reaction takes place over a 8–16 hr. period, after which the acid is neutralized with alkali (e.g., to a pH of 5.5) and the starch recovered by filtration. The resulting converted starch will require cooking to pregelatinize the starch.

In the preparation of the converted starches by enzyme treatment, the granular starch base or derivatized starch base is slurried in water, and the pH is adjusted to about 5.6–5.7 with alkali or acid. A small amount of alpha amylase enzyme (e.g., about 0.02% on the starch) is added to the slurry, which is then heated above the gelatinization point of the starch. When the desired conversion is reached, the pH is adjusted with acid (e.g., to about 2.0) to deactivate the enzyme and the dispersion is held at that pH for a period of at least 10 minutes. Thereafter the pH may be readjusted. The resulting converted starch dispersion is usually jet-cooked to ensure complete solubilization of the starch and deactivation of the residual enzyme.

In the preparation of the converted starches by oxidation with sodium hypochlorite, an aqueous starch suspension (35–44% solids) is usually treated with sodium hypochlorite solution (containing up to the indicated amount of active chlorine depending on the starch base) at pH 8–10 and 21°–38° C. The reaction is neutralized to pH 5–6.5 when the required level of oxidation (degradation) is reached and excess oxidant is destroyed by addition of sodium bisulfite solution or sulfur dioxide. The reaction product is washed to remove impurities, solubilized starch, and by-products of the reaction either on continuous vacuum filters or in hydrocyclones, recovered by filtration, and dried. The hypochlorite oxidizes a limited number of hydroxy groups to aldehyde, ketone, and carboxyl groups with concomitant cleavage of the glycoside bonds. The introduction of carboxyl groups into the linear amylose molecules reduces the tendency to gel. Such overstabilization must be avoided for converted high amylose starches herein and the previously indicated amount of active chlorine should not be exceeded. The resulting converted starch requires further cooking to pregelatinize the starch.

In the preparation of dextrins by pyrodextrinization, the granular starch is heated in the presence of moisture at a pH of about 2-8 until the proper conversion is reached, as indicated by the calcium chloride water fluidity value (for high amylose starches) or ABF value (for other starches).

It will be appreciated that, while the above acid- and enzyme-conversions may be carried out on either the derivatized starch or the underivatized starch, it is common practice to use the underivatized starch for the acid-conversion. It will also be appreciated that the degree of conversion, as indicated by the water fluidity, is affected by the amount of acid or enzyme used as well as the time and temperature. The conversion conditions should be adjusted to provide the preferred fluidities indicated hereafter.

Derivatized and converted and derivatized high amylose starches are also suitable for use herein. Suitable derivatives include esters such as the acetate and half-esters such as the succinate and octenylsuccinate prepared by reaction with acetic anhydride, succinic anhydride and octenylsuccinic anhydride, respectively; the phosphate derivative prepared by reaction with sodium or potassium orthophosphate or tripolyphosphate; ethers such as hydroxypropyl ether prepared by reaction with propylene oxide; and any other edible starch derivatives approved for use in food products.

Each modified starch should have the proper degree of substitution (D.S.) and/or conversion to provide the required balance between gel strength and melting characteristics. The amounts of derivatizing reagent used, as indicated hereinabove, will depend upon the type of reagent, the amylose content of the starch or starch mixtures, and the amount of conversion. Converted starches and starches having a higher amylose content (e.g., 70% vs. 50%) form stronger gels and vice versa. Typically as the conversion is increased, the derivatization should be decreased to provide a proper balance of properties (and vice versa). The practitioner will also recognize that the gel strength required will vary with the cheese type and its moisture content.

The octenylsuccinate derivatives are preferred when better emulsifying properties are required. The practitioner will recognize that the emulsifying properties required will depend not only on the oil or fat content of the cheese product but the amount of caseinate being replaced. The preferred starch derivatives for use in mozzarella cheese formulations that are equivalent to the imitation cheeses are jet-cooked or jet-cooked/-spray-dried high amylose corn starch derivatives which have been prepared by treatment with about 3-6% octenylsuccinic anhydride or jet-cooked or jet-cooked/spray-dried, acid-converted high amylose corn starch derivatives having the calcium chloride water fluidity (described hereafter) of 40 or less (prepared, for example, by treatment with about 1-3% hydrochloric acid) which have been treated with about 1-3% octenylsuccinic anhydride, e.g., high amylose corn (70% amylose) having a calcium chloride water fluidity of about 10-25 (prepared, for example, by treatment with about 1% hydrochloric acid) which has been treated with about 1% octenylsuccinic anhydride or high amylose corn (50% amylose) having a calcium chloride water fluidity of about 5-35 (prepared, for example, by treatment with about 2-3% hydrochloric acid) which has been treated with about 3% octenylsuccinic anhydride. Also preferred for the equivalent imitation cheeses are mixtures of a high amylose starch and a 50 water fluidity (W.F.) Amioca starch; the mixture should contain about 30-70 wt. % of the high amylose starch. The most preferred starch is a high amylose corn (50% amylose) treated with about 6% octenylsuccinic anhydride.

The crosslinking reaction is carried out according to standard procedures (see U.S. Pat. Nos. 2,328,537 issued Sept. 7, 1943 to G. E. Felton et al. and 2,801,242 issued July 30, 1957 to R. W. Kerr et al.) The reaction conditions employed will, of course, vary with the type of crosslinking agent used, as well as the type of starch base (i.e. high amylose vs. low amylose starches), the reaction scale, and the like. The reaction between the starch and crosslinking agent may be carried out in an aqueous medium, which is preferred, in which case the starch is slurried in water and adjusted to the proper pH and the crosslinking agent added thereto. The reaction is typically carried out at 5°-60° C., preferably 20°-40° C., for 0.2 to 2.4 hours. After the reaction is complete, the pH of the mixture is generally adjusted to 5.5-6.5 using a common acid or base as necessary. The granular product may be recovered by filtration and washed with water prior to pregelatinization. Pregelatinization is carried out by jet-cooking. Longer cooking times and/or higher cooking temperatures may be required to fully cook crosslinked high amylose starches.

Crosslinking agents suitable for food starches include epichlorohydrin, phosphorus oxychloride, sodium trimetaphosphate, and adipicacetic anhydride (e.g., 1:4). The currently permitted treatment levels include up to 0.3% epichlorohydrin and up to 0.1% phosphorus oxychloride. Treatments with sodium trimetaphosphate providing up to 0.04% bound (residual) phosphate, calculated as phosphorus are permitted. Treatments with adipic-acetic anhydride may include up to 0.12% adipic anhydride and up to 2.5% bound acetyl. Of the crosslinking agents discussed hereinabove, phosphorus oxychloride is preferred in an amount of about 0.05%.

The above starch modification procedures, i.e. pregelatinization, conversion, dextrinization, derivatization, and crosslinking are conventional and wellknown to those skilled in the art and described in such publications as "Handbook of Water-Soluble Gums and Resins", Robert L. Davidson (Editor), Chapter 22: Starch and Its Modifications by M. W. Rutenberg, McGraw Hill Book Co. (New York) 1980.

In the preparation of the modified starches, the conversion or dextrinization, is typically carried out prior to the pregelatinization step; however, it is possible to pregelatinize the starch prior to these treatments. Likewise, typically the derivatization or crosslinking is carried out prior to pregelatinization; however, this sequence can also be reversed.

The preparation of the imitation cheeses is conventional and wellknown to those skilled in the art. Methods for the preparation of typical cheese products are described in the following patents, whose disclosures are incorporated herein by reference:

U.S. Pat. No. 4,232,050 and 4,075,360 (issued Nov. 4, 1980 and Feb. 21, 1978 to C. E. Rule) which disclose methods for the preparation of imitation mozzarella cheeses;

U.S. Pat. No. 4,197,322 (issued Apr. 8, 1980 to J. L. Middleton) which describes the preparation of imitation cheeses such as mozzerella and processed American Cheeses;

U.S. Pat. No. 4,104,413 (issued Aug. 1, 1978 to J. D. Wynn et al.) which describes the preparation of imitation cheeses such as mozzarella and cheddar cheeses;

U.S. Pat. No. 3,922,374 (issued Nov. 25, 1975 to R.J. Bell) which describes a process for the preparation of imitation cheeses such as pasta filata (mozzarella), cheddar, and pasteurized processed American cheeses;

U.S. Pat. No. 3,397,994 (issued Aug. 20, 1968 to G. D. Elenbogen et al.) and

U.S. Pat. No. 4,166,142 (issued Aug. 28, 1979 to G. D. Elenbogen) which describe methods for the preparation of imitation cream cheese spread and imitation cheese spreads;

U.S. Pat. No. 3,502,481 (issued Mar. 24, 1970 to J. A. Schaap et al.) which describes the preparation of cheese-like spreads;

U.S. Pat. No. 3,806,606 (issued Apr. 23, 1974 to P. Seiden) which describes the preparation of synthetic cheese having the texture and eating quality of natural dairy cheese; and U.S. Pat. No. 4,110,484 (issued Aug. 29, 1978 to C. E. Rule) which describes a process for the manufacture of acid-set imitation and filled cheese products.

The preferred imitation mozzarella cheeses herein are typically prepared from 20 to 24% of a vegetable fat such as shortenings like Crisco or vegetables oils such as corn, sesame, cottonseed, safflower, groundnut, coconut, soybean, olive, palm kernel, and/or wheatgerm oil; from 20 to 30% of a mixture of 20-80% sodium and calcium caseinates and about 20-80% of the pregelatinized converted and/or derivatized high amylose starch or its mixtures with other starches; about 42 to 50% water; about 0.5 to 3.0% sodium chloride; about 0.8 to 2.5% trisodium phosphate, sodium aluminum phosphate, and/or calcium phosphate; 0.5 to 2.0% adipic, lactic and/or sorbic acid; and 0.0001 to 1% cheese additives such as butter flavoring. An imitation mozzarella cheese which is functionally equivalent to the caseinate-based cheese can be prepared with 20 to 30% of the above high amylose starch and no caseinate is required.

In imitation mozzarella cheese, a mixture of sodium and calcium caseinate is used to provide the final stretch, emulsifying, gel and melt properties. The ratio of sodium to calcium caseinate may be about 10-90:90-10, preferably 30-70:70-30. For the replacement cheeses both high sodium and high calcium caseinate systems are useful with the starches herein. The solubilized caseinates may be formed in situ by adding an alkali such as sodium, potassium or calcium hydroxide to dispersions of acid casein or rennet casein.

It is surprising that the pregelatinized converted high amylose starches herein can replace all of the caseinate and form cheese products that show no oil loss during preparation and have acceptable properties. It is also surprising that selected derivatized pregelatinized high amylose starches provide an imitation mozarrella cheese product fully equivalent to the caseinate-based products.

Typically, the above cheeses are prepared by forming an emulsion of the caseinates, starch, and water with the melted fat or oil and adding the salts and acids at the appropriate times. The mixture is heated during the emulsification and the final plastic mass is compressed and refrigerated for several days.

The emulsion may be formed in several ways, such as the following:

(1) mixing the phosphate salts with water and casein, allowing the casein to partially hydrate, and then adding the oil, starch, acids, remaining salts, flavor and color;

(2) blending the casein and starch with the oil and then adding the water, salts, flavor and color;

(3) adding all the ingredients (both wet and dry) and mixing them in a cooker with a double screw mixing system;

(4) mixing the water (hot) and all the salts, adding a blend a casein and starch, and then adding the salts, acid, flavor and color;

(5) mixing the oil and water, adding the blended casein and starch, and then adding the salts, acids, flavor and color;

(6) mixing all the dry ingredients except the acids, adding about 75% of the water (hot), adding most of the oil (about 70%), and then adding the remaining water, acids, and remaining oil; or (7) mixing the casein, salts, and water, adding a mixture of the oil and starch, and adding the acids, flavor, and color after cooking.

The above procedures may also be used when no casein is present and when melted fat is used in place of oil. Typically the cooking is carried out by heating the mixture to an internal temperature of about 76°–85° C. (170°–175° F.). The cooking time may vary from 65 seconds to 7.5 minutes and will depend upon the type of cooker selected, many of which use steam injection.

Imitation processed American and Cheddar cheeses have a similar composition except that different salt(s) and/or acid(s) are used in their preparation.

In the examples which follow, all parts and percentages are given by weight and all temperatures are in degrees Celsius unless otherwise noted. The cheese preparation and evaluation was as follows:

Preparation of The Cheese

The cheeses were prepared by dry blending the caseinates (control cheese), caseinates and starch (replacement cheese), or starch (total replacement cheese) at low speed in a Hobart mixer. The melted shortening or oil was blended in and mixing was continued for 3 minutes. About ½ of the mixture was removed and, while continuing agitation, about 85% of the water was added. Mixing was continued for about 1 minute until the emulsion was homogeneous. The removed mixture was added and agitation was continued for about 2 minutes. Sorbic acid and the setting salts were then added at medium speed and mixing was continued until the mixture was homogeneous. The adipic acid and remaining water were added and mixed in. The resulting cheeses were removed, pressed slightly to firm the mixture, and refrigerated at 4° C. (40° F.) for 1-3 days. The laboratory preparation, simulates a typical commercial preparation wherein steam is injected into the final mixture.

The control cheese and cheese containing the starch at 50% replacement were formulated as follows:

| Ingredients (parts) | High Sodium Caseinate Cheese Formulation[a] | | High Calcium Caseinate Cheese Formulation[b] | |
|---|---|---|---|---|
| | (Control) | (Replacement) | (Control) | (Replacement) |
| Sodium Caseinate | 21.2 | 10.6 | 5.4 | 2.7 |
| Calcium Caseinate | 5.4 | 2.7 | 21.2 | 10.6 |
| Starch | — | 13.3 | — | 13.3 |
| Shortening | 22.8 | 22.8 | 22.6 | 22.6 |
| Sodium Chloride | 0.9 | 0.9 | 0.9 | 0.9 |
| Trisodium Phosphate | 0.3 | 0.3 | 0.3 | 0.3 |
| Sodium Aluminum Phosphate | 0.3 | 0.3 | 0.3 | 0.3 |
| Calcium Phosphate | 0.3 | 0.3 | 0.3 | 0.3 |
| Adipic Acid | 0.3 | 0.3 | 0.3 | 0.3 |
| Sorbic Acid | 0.3 | 0.3 | 0.3 | 0.3 |
| Water | 48.5 | 48.5 | 48.5 | 48.5 |
| | 100.3 | 100.3 | 100.3 | 100.3 |

[a] 70%/30% Na/Ca caseinate
[b] 70%/30% Ca/Na caseinate

Cheese Evaluation

The cheeses were evaluated for gel strength, emulsion stability during preparation (oil retention or oil loss) and after preparation (oil release on the cheese surface), and stretch properties by touching and pulling the cheese; for shred by grating the cheese; for melt by heating the grated cheese on a pizza and observing the melt characteristics, i.e., fusion, lack of fusion, or excessive fusion (too much melting resulting in a translucent layer), as well as too little or excessive oil in the melt; and for string by pulling the melted cheese apart. The cheeses were given an overall rating based on the above properties with cheeses which lost oil during their preparation being given a rating of zero. Gel strength and shred were considered the next most important properties. A rating below 5 was considered unsatisfactory. To be acceptable, the cheese must have a rating of at least 5 must and be capable of melting. The cheese must also be satisfactory in flavor, texture, and mouthfeel. A perfect replacement cheese, which would have a very firm gel and excellent shred, melt, oil release and string, would have an overall rating of 10. Equivalent replacement cheeses which had a rating of 8-9 were comparable to or better than the control in gel, shred, melt, oil release, and string. Nevertheless, both the high sodium and high calcium caseinate control cheeses were given automatic ratings of 10. Typically, the high calcium caseinate control cheese is better than the high sodium caseinate control in melt, oil release, and string.

EXAMPLE I

This example describes the preparation of imitation mozzarella cheeses which contain a pregelatinized modified (converted and derivatized) potato amylose.

Preparation of The Converted Amylose

A slurry of 100 parts of potato amylose in 150 parts of water was heated to 52° C., the indicated amount of hydrochloric acid (1.75%) was added, and the mixture was stirred for 16 hours at 52° C. The hydrolysis was stopped by neutralizing the mixture with alkali (a solution of 3% sodium hydroxide) to a pH of 5.5. The converted amylose was recovered by filtration, washed and dried.

Preparation of The Derivatized Amylose

The derivative was prepared by slurrying 100 parts of the above converted amylose into a solution of 30 parts sodium sulfate in 150 parts water, adding 1.5 parts sodium hydroxide, and then adding the indicated amount of propylene oxide (25% PO). The slurry was agitated for 16 hours at 40° C. in a sealed vessel. When the reaction was completed, the pH was adjusted to 5.5 with acid. The modified starch (converted and derivatized) was recovered by filtration, washed, and air dried.

Pregelatinization of The Modified Amylose

A total of 100 parts of the modified amylose was then slurried in 233 parts of water and passed through a continuous steam jet-cooker (JC) at 138° C. The resulting dispersion was spray-dried (SD) at a chamber temperature of 210° C. and an outlet temperature of 90° C.

The pregelatinized modified amylose was evaluated at 50% replacement in the high sodium and high calcium caseinate cheese formulations. The results are shown in Table I.

The results show that, in the high sodium caseinate cheese formulation, the product containing the modified amylose starch was better than the control in string, melt and oil release, equivalent in gel strength, but somewhat poorer in shred (very slightly matted). In the high calcium caseinate cheese formulation, the product containing the modified amylose was better in melt, equivalent in oil release and string, but poorer in gel (slightly soft) and shred (slightly matted). The imitation mozzarella cheese products containing the modified amylose as a partial caseinate replacement were functionally equivalent to the controls for both the high sodium and high calcium caseinate cheese formulations. Similar cheese products may be prepared using olive oil, partially hydrogenated soy bean oil, and various solidified hydrogenated vegetable oils and comparable results would be expected.

TABLE I

| Cheese Formulations | Caseinate Replacement Level (%) | Gel | Shred | Melt | Oil Release | String | Overall Rating |
|---|---|---|---|---|---|---|---|
| High Na Caseinate Control | 0% | Firm | V. Good | Poor[b] | Fair | Poor[c] | 10[d] |
| High Na Caseinate/Amylose[a] | 50% | Firm | Good (v. sl. matted) | Fair (better fusion) | Good | Good | 7 |
| High Ca Caseinate Control | 0% | Firm | V. Good | Good | Good | Good | 10[d] |
| High Ca Caseinate/Amylose[a] | 50% | Sl. Soft | Fair | Excellent | Good | Good | 6 |

TABLE I-continued

| Cheese Formulations | Caseinate Replacement Level (%) | Gel | Shred | Melt | Oil Release | String | Overall Rating |
|---|---|---|---|---|---|---|---|
| | | | (sl. matted) | | | | |

[a.]100% amylose (1.75% HCl); 25% PO; JC/SD having a calcium chloride water fluidity (CaCl₂ WF) of 55. Water fluidity (WF) is a measurement commonly used to determine the viscosity of converted starches and described in U.S. Pat. No. 4,288,199 issued Oct. 14, 1980 to C. W. Chiu et al. Calcium chloride water fluidity is determined using the procedure described in the above patent except that 100 g. of a 20% calcium chloride solution is used in place of 100 g. of water and a stainless steel cup is used in place of the copper cup.
[b.]No fusion of grated cheese pieces.
[c.]Too short.
[d.]As indicated, the controls were given an automatic rating of 10 despite the differences in their properties.

EXAMPLE II

This example describes the preparation of imitation mozzarella cheeses, based on the high calcium caseinate formulation, containing various high amylose starches at replacement levels of 25, 50, and 100%.

The converted starches were prepared using the procedure described in Example I. The derivatized and crosslinked starches were prepared using the procedures described below. The starches were pregelatinized using the procedure of Example I except that in some cases the resulting starch dispersion, adjusted to the solids content required for the replacement cheese being prepared, was used directly in the cheese formulation without spray drying and the crosslinked starch was jet cooked at 143° C. instead of 138° C.

Preparation of The Octenylsuccinate Derivative

The converted starch was slurried in 150 parts water, the pH was adjusted to 7.5 with sodium hydroxide, and the indicated amount of octenylsuccinate anhydride (OSA) was added slowly while the pH was maintained at 7.5 with the alkali. The reaction was complete when no further addition of alkali was necessary. The pH was adjusted and the resulting derivatives were recovered as in Example I.

Preparation of The Acetate Derivative

The derivative was prepared by slurrying 100 parts of the converted starch in 150 parts water, adjusting the pH to 8.3 with 3% sodium hydroxide solution, and slowly adding the indicated amount of acetic anhydride (Ac₂O) while maintaining the pH at 8.3 with the above alkali. The reaction was complete when no further addition of alkali was necessary. The pH was adjusted and the resulting derivative was recovered as in Example I.

Preparation of The Crosslinked Starch

The crosslinked starch was prepared by slurrying 100 parts of starch in 150 parts water, adding 0.8 part sodium hydroxide, 1.0 part sodium chloride, and then adding the indicated amount of phosphorus oxychloride. The slurry was agitated for 3 hours at room temperature. When the reaction was completed, the pH was adjusted to 5.5 with acid. The starch was recovered by filtration, washed, and air dried.

The cheese evaluations are summarized in Table II. The results show that the pregelatinized modified (i.e. converted, derivatized, derivatized and coverted, and crosslinked) Hylin V and VII starches (tradename of National Starch and Chemical Corp. for high amylose starches having amylose contents of about 50 and 70%, respectively) all gave acceptable cheese products at 25–50% replacement. The converted Hylon V and VII starches gave acceptable cheese products even at 100% replacement, but the derivatized converted Hylon V and VII starches which were overstabilized (treated with above 0.75% OSA) gave unacceptable cheese products at this replacement level. The Hylon V starch treated with 6% OSA provided the best cheese product. The Hylon V starches treated with 2% and 3% HCl and 3% OSA and Hylon VII starch treated with 1% HCl and 1% OSA also provided excellent cheeses. The products having overall ratings of 8–9 were equivalent to or better than control.

EXAMPLE III

This example describes the use of a modified high amylose starch at 50% replacement in other cheese formulations. The control cheeses and starch-containing cheeses should be formulated as before using the following ingredients:

| Ingredients (parts) | Cheddar Cheese (Control) | Cheddar Cheese (Replacement) | American Cheese (Control) | American Cheese (Replacement) |
|---|---|---|---|---|
| Calcium caseinate | 21.0 | 10.5 | 20.0 | 10.0 |
| Sodium caseinate | 5.0 | 2.5 | 5.0 | 2.5 |
| Modified Starch | — | 13.0 | — | 12.5 |
| Shortening | 32.3 | 32.3 | 28.1 | 28.1 |
| Salt | 2.2 | 2.2 | 2.0 | 2.0 |
| Sodium aluminum phosphate | 0.5 | 0.9 | 0.9 | 0.9 |
| Citric acid | 0.9 | 0.5 | 0.5 | 0.5 |
| Sodium citrate | 0.4 | 0.4 | 0.2 | 0.2 |
| Cheese flavoring | — | — | — | — |
| Cheese coloring | — | — | — | — |
| Water | 37.6 | 37.6 | 43.3 | 43.3 |
| | 100.0 | 100.0 | 100.0 | 100.0 |

TABLE II

| STARCH | | | CHEESE | | | | | | |
|---|---|---|---|---|---|---|---|---|---|
| Modification | Estimated Amylose Content (%) | CaCl₂ WF | Replacement Level (%) | Gel | Shred | Melt | Oil Release | String | Overall Rating |
| Control Cheese (no starch) | | | 0 | Firm | V. Good | Good | Good | Good | 10 |
| Hylon V; 6% OSA; JC | 50 | * | 50 | Firm[a.] | Excellent | Excellent[a.] | Good | Excellent | 9 |
| Hylon V; 1% Ac₂O; JC | 50 | * | 50 | V. Firm | Excellent | Poor | Fair | Poor | 7 |

TABLE II-continued

| | STARCH | | CHEESE | | | | | |
|---|---|---|---|---|---|---|---|---|
| Modification | Estimated Amylose Content (%) | CaCl$_2$ WF | Replacement Level (%) | Gel | Shred | Melt | Oil Release | String | Overall Rating |
| Hylon V; 10% Ac$_2$O; JC | 50 | * | 50 | S. Soft | Fair (sl. matted) | Fair | Fair | Fair | 5 |
| Hylon V (1% HCl); 1% Ac$_2$O; JC | 50 | * | 50 | V. Firm | Excellent | Poor | Fair | Fair | 7 |
| Hylon VII (1% HCl); 1% OSA; JC/SD | 70 | 17 | 50 | V. Firm | Good | Good | Good | Good | 8 |
| Hylon V (1% HCl); 3% OSA; JC/SD | 50 | * | 50 | Firm$^a$ | Good (sl. brittle) | Good | Fair | Fair | 6.5 |
| Hylon V (2% HCl); 3% OSA; JC/SD | 50 | 13 | 50 | Firm$^a$ | V. Good | Good | Good | Good | 8 |
| Hylon V (3% HCl); 3% OSA; JC/SD | 50 | 32 | 50 | Firm$^a$ | V. Good | Good | Fair | Good | 7 |
| Hylon V (4% HCl); 3% OSA; JC/SD | 50 | 46 | 50 | Firm | Good | Good | Fair | Good | 7 |
| Hylon V; 0.05% POCl$_3$; JC | 50 | * | 50 | Firm | Good | Fair | Fair | Fair | 6 |
| Hylon V (2% HCl); JC | 50 | 13 | 100 | V. Firm | Good | Poor | Fair | Poor | 5.5 |
| Hylon V (2% HCl); 3% OSA; JC | 50 | 13 | 100 | V. Soft | Poor (matted) | Fair | Fair | Poor | 2.5 |
| Hylon VII (2% HCl); JC | 70 | 31 | 100 | Firm | Good | Poor | Fair | Poor | 5 |
| Hylon VII (2% HCl); 0.75% OSA; JC | 70 | 32 | 100 | Firm | Good | Poor | Fair | Poor | 5 |
| Hylon VII (2% HCl); 1.5% OSA; JC | 70 | 33 | 100 | Sl. Soft (bready) | Poor (matted) | Poor | Fair | Poor | 3 |
| Hylon VII (2% HCl); 3.0% OSA; JC | 70 | N.D. | 100 | Soft | Poor (matted) | Poor | Fair | Poor | 2.5 |

$^a$·Like the Control Cheese
*Too thick (i.e., high in viscosity) to be measured.
N.D. - Not Determined.

The modified starch used in the imitation cheddar cheese was Hylon V, acid-converted with 2% HCl, derivatized with 3% octenylsuccinic anhydride, jet-cooked and spray-dried. The resulting cheese was acceptable. In comparison with the control, the gel was satisfactory (firm vs. very firm); shred was poorer (very slightly wet with slight matting vs. very slightly brittle with no matting); melt was good (slight fusion with slight to moderate oil release vs. no fusion with no oil release); and flavor was equivalent.

The modified starch suggested for use in the imitation processed American cheese is Hylon V, acid-converted with 1–2% HCl, derivatized with up to 2% octenylsuccinic anhydride, jet-cooked and spray-dried. Comparable results would be expected and an acceptable product should result.

EXAMPLE IV

This example demonstrates that the starches to be suitable herein for 100% replacement must have the high amylose content. A drum-dried (DD) underivatized corn starch and jet-cooked, spray-dried underivatized and derivatized 20 W.F. corn starches were evaluated in the high calcium caseinate imitation mozzarella cheese formulation. The results are shown in Table III which includes data from Table II on suitable modified high amylose corn starches.

The results show that the cheeses containing the corn starch all lost oil and were unacceptable. They were also poor in shred, melt, and string.

TABLE III

| | STARCH* | | CHEESE | | | | | |
|---|---|---|---|---|---|---|---|---|
| Modification | Estimated Amylose Content (%) | CaCl$_2$ WF | Replacement Level (%) | Gel | Shred | Emulsion**** Stability (oil loss) | Melt | Oil Release | String | Overall Rating |
| D.D. corn (comparative) | 27 | N.D. | 100 | Soft** | Poor | Poor (50 cc.) | Poor | Fair | Poor | 0 |
| 20 WF corn; JC/SD (comparative) | 27 | — | 100 | Soft** | Poor | Poor (50 cc.) | Poor | Poor | Poor | 0 |
| 20 WF corn; 3% OSA; JC/SD (comparative) | 27 | — | 100 | V. Soft** | Fair | Poor (20 cc.) | Good | Poor | Fair | 0 |
| 40 WF corn; 1% OSA; JC/SD (comparative) | 27 | — | 100 | Soft*** | Poor | Good | Poor | Poor | Poor | 2 |
| Hylon V (2% HCl); JC | 50 | 13 | 100 | V. Firm | Good | Good | Poor | Fair | Poor | 5 |
| Hylon VII (2% HCl); JC | 70 | 31 | 100 | Firm | Good | Good | Poor | Fair | Poor | 5 |
| Hylon VII (2% HCl); 0.75% OSA; JC | 70 | 32 | 100 | Firm | Good | Good | Poor | Fair | Poor | 5 |

TABLE III-continued

| | STARCH* | | CHEESE | | | | | | |
|---|---|---|---|---|---|---|---|---|---|
| Modification | Estimated Amylose Content (%) | CaCl$_2$ WF | Replacement Level (%) | Gel | Shred | Emulsion**** Stability (oil loss) | Melt | Oil Release | String | Overall Rating |
| Control Cheese | — | — | 0 | Firm | V. Good | Good | Good | Good | Good | 10 |

*WF starches were modified by conversion. Water fluidity (WF) determination procedure - see footnote of Table I.
**Like cottage cheese
***Crumbles
****About 100 cc. of melted shortening was used in the cheese preparation.

The converted high amylose starches and the derivative thereof, converted high amylose starches and the derivative thereof, however, formed acceptable cheese products

TABLE IV

| | Estimated Amylose Content (%) | CaCl$_2$ WF | Gel | Shred | Emulsion** Stability (oil loss) | Melt | Oil Release | String | Overall Rating |
|---|---|---|---|---|---|---|---|---|---|
| Control | — | | Firm | V. Good | Good | Good | Good | Good | 10 |
| 50 WF Amioca; JC | 0 | — | V. Soft | Matted | Poor (30 cc) | Poor (too much fusion) | Fair | Fair | 0 |
| Hylon V/50 WF Amioca; JC (30/70 wt. %) | 15 | N.D. | Firm | Excellent | Good | Good | Good | Good | 8 |
| Hylon V/50 WF Amioca; JC (40/60 wt. %) | 20 | N.D. | Firm | Excellent | Good | Good | Good | Good | 8 |
| Hylon V/50 WF Amioca; JC (70/30 wt. %) | 35 | N.D. | V. Firm | Excellent | Good | Good | Good | Good | 9 |
| Hylon V | 50 | **** | Soft (bready) | Poor (matted sl. wet) | Good | Poor (no fusion) | Poor (none) | Poor (pasty) | 2*** |
| Hylon V; JC | 50 | **** | Firm | Fair | Good | Poor (no fusion) | Poor (none) | Poor (pasty) | 4 |
| Hylon VII; JC | 50 | **** | Firm | Fair | Good | Poor (no fusion) | Poor (none) | Poor (pasty) | 4 |

*WF starches were modified by conversion. Water fluidity (WF) - see the footnote of Table I.
**About 100 cc. of melted shortening were used in the cheese preparation.
***The cheese product was unacceptable in flavor (starchy) and color (white instead of creamy).
****Too thick to be measured.

EXAMPLE V

This example demonstrates that the high amylose starch, when used as a sole replacement, must be pregelatinized and converted to form an acceptable cheese product. It also shows that pregelatinized unmodified high amylose starches can be mixed with starches having lower amylose contents or with starches having little or no amylose to form acceptable cheeses. The mixtures were formulated from a 50 WF Amioca (approximately 0% amylose) and Hylon V corn starch (approximately 50% amylose) to give the indicated amylose content. The evaluations were carried out at 50% replacement in the high calcium caseinate formulation. For comparison, the results obtained using a jet-cooked 50 WF Amioca, jet-cooked Hylon V and Hylon VII, and uncooked Hylon V are included. The results are given in Table IV.

The results show that the Hylon V starch which had not been pregelatinized formed an unacceptable cheese product even though its emulsion stability was good (no oil loss during preparation). It was inferior to the cheeses containing the jet-cooked Hylon V and Hylon VII starches in gel and shred (soft vs. firm gel and poor vs. fair shred). In addition, it had an unacceptable flavor and appearance. The jet-cooked Hylon V and Hylon VII that had not been converted were likewise not satisfactory since they did not fuse (i.e., melt) and hence showed no oil release or string.

The results also show that the jet-cooked unmodified high amylose starch can be used in admixture with other starches. As the amylose content increased (from 0% for the Amioca to 15%) the gel became firm. The starch mixtures containing from 30 to 70% of the high amylose starch (about 15-35% amylose) provided cheese products that were fully equivalent to the control in all properties. The cheese containing no amylose, i.e., the 50 WF Amioca (0% amylose) was unacceptable having lost oil.

EXAMPLE VI

This example shows the use of oxidized starches and dextrins as caseinate replacements at the 50% level in the high calcium caseinate cheese formulation. It also establishes the maximum treatment levels that give acceptable cheese products.

Part A-Oxidized Starches

The starches were prepared by slurrying 100 parts of Hylon V starch in 150 parts water and adjusting the pH to 5.5 with acid or alkali. The starch slurry was placed in insulated jars and the alkaline sodium hypochlorite solution containing the indicated level of active chlorine was slowly added over a 90 min. period. The reaction was carried out over a 16 hr. period at room temperature. Any excess chlorine was neutralized with a solution of sodium bisulfite, the pH was adjusted to 5.5 with acid, and the oxidized starch recovered by filtration, washed, and dried. The oxidized starches were jet-cooked and evaluated in the cheese. The results are given in Table V which includes data from Table IV on the non-converted Hylon V.

The results show that the oxidized starches formed acceptable cheese products provided they were not overstabilized. As the treatment level reached 5.5% active Cl the starch became overstabilized.

Part B - Dextrins

The dextrins were prepared by spraying an agitated granular Hylon V starch with an aqueous hydrochloric acid solution (1 part acid/3 parts water). Spraying was continued until the pH of the starch was 3.2. The acidified starch was screened through a U.S. #40 mesh screen to remove large particles which would char upon dextrinization. The starch (11.4% moisture) was then heated in a dextrinizer with samples being removed at various time intervals as the temperature of the starch increased and its moisture content decreased. The temperature and moisture content of the dextrins was as follows: at 1.75 hr., 110° C. and 4.0%., at 2.0 hr., 118° C and 2.6%., at 2.25 hr., 124° C. and 0.8%; and at 2.5 hr., 135° C. and 0%. The dextrins were jet-cooked and evaluated in the cheese. The results are given in Table V.

The results show that the mildly converted dextrins (heating times of 2.25 hr. or less) having ABF values greater than 4 provided acceptable cheese products. The cheese containing the Hylon V dextrinized for 2.5 hr. (ABF value of approximately 4) was unacceptable in all properties.

EXAMPLE VII

This example demonstrates that mixtures of an unmodified pregelatinized high amylose starch (50% amylose) with mildly converted corn dextrins can be used in the cheese preparation and that mixtures with moderately or highly converted corn dextrins can not be used. It also determines the minimum amount of high amylose starch that must be present in the mixtures. The starch blends were evaluated at 50% replacement in the high calcium caseinate formulation. The cheese evaluations are summarized in Table VI. The ABF values were determined using the procedure described previously.

The results show that the ⅓ mixtures (25/75 wt.%) containing the moderatly converted (4 ABF) and highly converted (2 ABF) corn dextrins formed unacceptable cheese products with soft gels, poor shredding characteristics, and an off-taste and color. The ⅓ mixture containing the mildly converted corn dextrin (6 ABF) formed an acceptable cheese product with a firm gel, good shredding characteristics, and no off taste but with poorer melt, oil release, and string than the control (fair vs. good). None of the cheese lost oil during their preparation.

The results also show that mixtures containing from 25-75% of the 6 ABF corn dextrin gave acceptable cheese products with firm gels and good shredding characteristics (no matting) but with only fair to poor melt, string, and oil release. The mixture containing about 83% of the 6 ABF corn dextrin gave an unacceptable cheese; the gel was soft and the shred was matted. It is thus indicated that the starch mixtures must contain a minimum amount of high amylose starch (at least 20%, preferably 25% or above) to provide an acceptable gel even through the mixture had a high total amylose content (31–45%).

TABLE V

| STARCH (conversion - type and level) | CaCl₂ WF | CHEESE | | | | | |
|---|---|---|---|---|---|---|---|
| | | Gel | Shred | Melt | Oil Release | String | Overall Rating |
| Hylon V (oxidized - 2.5% active Cl); JC | * | Firm | Good | Poor | Fair | Poor | 5 |
| Hylon V (oxidized - 3.5% active Cl); JC | * | Firm. | Good | Poor | Fair | Poor | 5 |
| Hylon V (oxidized - 5.5% active Cl); JC | * | Sl. Soft | Poor (matted) | Fair | Fair | Fair | 4 |
| Hylon V (dextrinized - 1.75 hr.); JC | N.D. | Firm | Good | Poor | Poor | Good | 6 |
| Hylon V (dextrinized - 2.0 hr.); JC | N.D. | Firm | Good | Fair | Good | Good | 7 |
| Hylon V (dextrinized - 2.25 hr.); JC | 48 | Sl. Soft | Fair | Fair | Fair | Good | 5 |
| Hylon V (dextrinized - 2.5 hr.); JC* | N.D. | Soft (bready) | Poor (matted) | Poor | Poor | Poor | 2 |
| Hylon V (non-converted); JC | — | Firm | Fair | Poor (no fusion) | Poor (none) | Poor (pasty) | 4 |

*Too thick to be determined.

TABLE VI

| STARCH/DEXTRIN MIXTURE | Estimated Total taste; Content (%)* | CHEESE | | | | | |
|---|---|---|---|---|---|---|---|
| | | Gel | Shred | Melt | Oil Release | Overall**** String | Rating |
| Hylon V/2 ABF Corn Dextrin (25/75 wt. %) | 33.5 | Soft** | Poor (matted, wet) | Good | Good | Good | 4 |
| Hylon V/4 ABF Corn Dextrin (25/75 wt. %) | 33.5 | Soft** | Poor (matted sl. wet) | Good | Good | Good | 4 |
| Hylon V/6 ABF Corn Dextrin (25/75 wt. %) | 33.5 | Firm*** | Good | Fair | Fair | Fair | 6 |
| Hylon V/6 ABF Corn Dextrin (75/25 wt. %) | 44.5 | Firm*** | Good | Poor | Poor | Poor | 5 |
| Hylon V/6 ABF Corn Dextrin (50/50 wt. %) | 39.0 | Firm*** | Good | Fair | Fair | Poor | 5.5 |
| Hylon V/6 ABF Corn Dextrin | 31.7 | Soft** | Poor | Good | Fair | Fair | 4 |

TABLE VI-continued

| STARCH/DEXTRIN MIXTURE | CHEESE | | | | | | |
|---|---|---|---|---|---|---|---|
| | Estimated Total taste; Content (%)* | Gel | Shred | Oil Melt | Release | Overall**** String | Rating |
| (17/83 wt. %) | | | (matted) | | | | |

*Estimates based on the amylose content of the Hylon V and the amylose content of the corn prior to dextrinization.
**Bready and unacceptable with significant matting.
***Firmer than control for the 3/1 and 1/1 blends and slightly firmer than the control for the 1/3 blend.
****The cheeses containing the 2 and 4 ABF dextrins had a very poor color and poor taset; the cheese containing the 6 ABF dextrin had an acceptable taste.

EXAMPLE VIII

This example compares the imitation cheeses of the present invention with the simulated cheese products of U.S. Pat. No. 3,741,774 (discussed in the Background of the Invention). The imitation mozzarella cheeses, based on the high calcium caseinate formulation, were prepared and evaluated as in Example II. The jet-cooked, spray-dried starches used were an unmodified Hylon V, converted Hylon V, and converted and derivatized Hylon V. The simulated cheese products were prepared using the procedure of the only Example in U.S. Pat. No. 3,741,774. The simulated cheese designated A was the same as that in the Example; that designated B was prepared with the maximum amount of the optional oil (7%) suggested for use in the simulated cheese, as well as the maximum amount of real cheese (25%) suggested for inclusion in the simulated product. The results are shown in Table VII.

The results show that the simulated cheese product containing no oil did not melt and was unacceptable. The simulated cheese product which contained the maximum amount of cheese and oil likewise did not melt (charred instead).

The results further show that the imitation cheese containing the unmodified Hylon V, which was fair in melt at 25% replacement, did not melt at 50% replacement. In contrast, the converted Hylon V was good in melt at 25% replacement and fair at 50%. The converted and derivatized Hylon V was excellent in melt and comparable or better in all properties than the control cheese.

In summary, it is shown that the converted high amylose starches are unique in their performance and necessary when a functional cheese (i.e., meltable cheese) is desired. The importance of the presence of the high amylose starch was demonstrated in Example IV where it was shown that cheese containing pregelatinized corn starch lost oil. It was also demonstrated in the preceding Example where it was shown that mixtures of the high amylose starch and lower amylose starches must contain a minimum amount of high amylose starch even though the mixture had a high total amylose content.

Summarizing, this invention is seen to provide imitation cheese products functionally equivalent to caseinate- and vegetable fat-based imitation cheese products which contain pregelatinized modified high amylose starches as a partial or total replacement for the caseinates. It also provides imitation mozzarella cheeses containing selected modified starches or starch blends which are fully equivalent to or better than the control cheese.

TABLE VII

| IMITATION MOZZARELLA CHEESE | | | | | | | |
|---|---|---|---|---|---|---|---|
| STARCH | Replacement Level | Gel | Shred | Melt | Oil Release | String | Overall Rating |
| Control Cheese (no starch) | 0 | Firm | V. Good | Good | Good | Good | 10 |
| Hylon V; JC/SD | 25 | Firm | Good | Fair | Fair | Poor | 5.5 |
| Hylon V; JC/SD | 50 | Firm | Fair | Poor (no fusion) | Poor | Poor | 4 |
| Hylon V (4% HCl); JC/SD | 25 | Firm | Poor[a.] | Good | Good | Good | 6 |
| Hylon V (4% HCl); JC/SD | 50 | V. Sl. Soft | Poor[a.] | Fair | Good | Fair | 5 |
| Hylon V (3% HCl); 3% OSA; JC/SD | 25 | Firm | V. Good[b.] | Excellent | Good | Excellent | 9 |

| SIMULATED CHEESE PRODUCT (Comparative) | | | | | | | |
|---|---|---|---|---|---|---|---|
| STARCH | Starch % | Gel | Shred | Melt | Oil Release | String | Overall Rating |
| A - Pregelatinized tapioca | 18[c.] | Sl. Soft | Poor[a.] | None | Poor | Poor | 3 |
| B - Pregelatinized tapioca | 13[d.] | Firm | Fair[c.] | None[f.] | Poor | Poor | 5 |

[a.]Matting
[b.]Little wetter than control
[c.]5.5% cheese and no oil
[d.]25% cheese and 7% oil
[e.]Crumbled
[f.]Charred Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. An imitation cheese product consisting essentially of water, an edible vegetable fat or vegetable oil, cheese additives, and at least one edible caseinate, wherein the improvement comprises the replacement of 25 to 50% of the caseinate by an edible pregelatinized modified starch having an amylose content of at least 40% by weight, the modified starch being selected from the group consisting of a derivatized starch, a converted starch, a converted and derivatized starch, and a crosslinked starch; the derivatized starch being prepared by treatment of the starch with up to about 25% propylene oxide, up to about 5% succinic anhydride, up to about 10% octenylsuccinic anhydride, a sufficient amount of acetic anhydride to provide a maximum of about 6% bound acetyl, or a sufficient amount of sodium or potassium orthophosphate, sodium or potassium tripolyphosphate, or a mixture thereof to provide a maximum of about 0.8% bound phosphate, calculated as phosphrous; the converted starch being selected from the group consisting of a fluidity starch prepared by acid- or enzyme-conversion of the starch, an oxidized starch prepared by treatment of the starch with less than about 5.5% active chlorine, and a dextrin having a calcium chloride water fluidity of less than about 50 prepared by pyrodextrinization of the starch; the starch being pregelatinized before or after modification of the starch by derivatization, conversion, derivatization and conversion, or crosslinking; the treatment percentages being by weight based on the starch; the cheese product containing the starch replacement being functionally equivalent to the cheese containing no caseinate replacement.

2. The product of claim 1, wherein the caseinate is sodium, potassium or calcium caseinate or mixtures thereof.

3. The product of claim 1, wherein the pregelatinized modified starch is a jet-cooked or jet-cooked/spray-dried corn starch.

4. The product of claim 3, wherein the corn starch has an amylose content of about 50–70%.

5. The product of claim 4, wherein the corn starch is a converted starch having a calcium chloride water fluidity of about 40 or less; a converted and derivatized starch having a calcium chloride water fluidity of about 40 or less and prepared by treatment of the starch with up to about 3% octenylsuccinic anhydride; a derivatized starch prepared by treatment of the starch with about 3–6% octenylsuccinic anhydride; or a crosslinked starch prepared by treatment of the starch with up to about 0.05% phosphorus oxychloride.

6. The product of claim 5, wherein the corn starch is a converted and derivatized starch (about 50% amylose) having a calcium chloride water fluidity of about 5–35 and prepared by treatment of the starch with about 3% octenylsuccinic anhydride; a converted and derivatized starch (about 70% amylose) having a calcium chloride water fluidity of about 10–25 and prepared by treatment of the starch with about 1% octenylsuccinic anhydride; or a derivatized starch (about 50% amylose) prepared by treatment of the starch with about 6% octenylsuccinic anhydride.

7. The product of claim 19, wherein the pregelatinized modified starch is a jet-cooked or a jet-cooked/spray-dried corn starch.

8. The product of claim 7, wherein the mozzarella cheese is substantially equivalent to the caseinate-based imitation cheese product, wherein the corn starch is a derivatized starch prepared by treatment of the starch with about 3–6% octenylsuccinic anhydride or a converted and derivatized starch having a calcium chloride water fluidity of about 40 or less and prepared by treatment of the starch with about 1-3% octenylsuccinic anhydride; the derivatized starch and the converted and derivatized starch having an amylose content of about 50-70% by weight.

9. The product of claim 8, wherein the derivatized corn starch derivative (about 50% amylose) is prepared by treatment of the starch with about 6% octenylsuccinic anhydride; wherein the converted and derivatized corn starch (about 50% amylose) has a calcium chloride water fluidity of about 5–35 and is prepared by treatment of the starch with about 3% octenylsuccinic anhydride; or wherein the converted and derivatized corn starch (about 70% amylose) has a calcium chloride water fluidity of about 10–25 and is prepared by treatment of the starch with about 1% octenylsuccinic anhydride.

10. The product of claim 9, wherein the ratio of sodium to calcium caseinate is about 30–70:70–30.

11. The product of claim 10, wherein the ratio of sodium to calcium caseinate is about 30:70.

12. An imitation cheese product consisting essentially of water, an edible vegetable fat or vegetable oil, cheese additives, and at least one edible caseinate, wherein the improvement comprises the replacement of 25 to 50% of the caseinate by a mixture of (a) an edible pregelatinized unmodified or modified starch having an amylose content of at least 40% by weight with up to 80% by weight of (b) an edible pregelatnized modified or unmodified starch having an amylose content of 0–40% by weight; the modified starch having the amylose content of at least 40% by weight being selected from the group consisting of a derivatized starch, a converted starch, a converted and derivatized starch, and a crosslinked starch; the derivatized starch being prepared by treatment of the starch with up to about 25% propylene oxide, up to about 5% succinic anhydride, up to about 10% octenylsuccinic anhydride, a sufficient amount of acetic anhydride to provide a maximum of about 6% bound acetyl, or a sufficient amount of sodium or potassium orthophosphate, sodium or potassium tripolyphosphate, or a mixture thereof to provide a maximum of about 0.8% bound phosphate, calculated as phosphorus; the converted starch being selected from the group consisting of a fluidity starch prepared by acid- or enzyme-conversion, an oxidized starch prepared by treatment with less than about 5.5% active chlorine, and a dextrin having a calcium chloride water fluidity of less than about 50; the starch being pregelatinized before or after modification of the starch by derivatization, conversion, derivatization and conversion, or crosslinking; the treatment percentages being by weight based on the starch.

13. The product of claim 12, wherein the replacement mixture is a mixture of (a) with about 30–70% of (b) and wherein (a) is a pregelatinized unmodified starch having an amylose content of about 50–70%.

14. The product of claim 9, wherein (a) is a jet-cooked or a jet-cooked/spray-dried unmodified starch having an amylose content of about 50% and (b) is a pregelatinized 50 WF Amioca starch having little or no amylose.

15. The product of claim 12, wherein the caseinate is sodium, potassium or calcium caseinate or mixtures thereof.

16. The product of claim 12, wherein the starch of (a) is a jet-cooked or jet-cooked/spary-dried corn starch having an amylose content of about 50–70%.

17. The product of claim 16, wherein the corn starch is a converted starch having a calcium chloride water fluidity of about 40 or less; a converted and derivatized starch having a calcium chloride water fluidity of about 40 or less and prepared by treatment of the starch with up to about 3% octenylsuccinic anhydride; a derivatized starch prepared by treatment of the starch with about 3–6% octenylsuccinic anhdride; or a crosslinked starch prepared by treatment of the starch with up to about 0.05% phosphorus oxychloride.

18. The product of claim 17, wherein the corn starch is a converted and derivatized starch (about 50% amylose) having a calcium chloride water fluidity of about 5–35 and prepared by treatment of the starch with about 3% octenylsuccinic anhydride; a converted and derivatized starch (about 70% amylose) having a calcium chloride water fluidity of about 10–25 and prepared by treatment of the starch with about 1% octenylsuccinic anhydride; or a derivatized starch (about 50% amylose) prepared by treatment of the starch with about 6% octenylsuccinic anhydride.

19. An imitiation cheese product, which is functionally equivalent to a caseinate-based imitation cheese product selected from the group consisting of mozzarella cheese, cheddar cheese, and processed American cheese, which consisting essentially of water, an edible vegetable fat or vegetable oil, cheese additives, and a mixture of about 20–80% by weight of sodium and calcium caseinate and about 80–20% by weight of edible pregelatinized modified starch having an amylose content of at least 40% by weight, the modified starch being selected from the group consisting of a derivatized starch, a converted starch, a converted and derivatized starch, and a crosslinked starch; the derivatized starch being prepared by treatment of the starch with up to about 25% propylene oxide, up to about 5% succinic anhydride, up to about 10% octenylsuccinic anhydride, or a sufficient amount of acetic anhydride to provide a maximum of about 6% bound acetyl, or a sufficient amount of sodium or potassium orthophosphate, sodium or potassium tripolyphosphate, or mixtures thereof to provide a maximum of about 0.8% bound phosphate, calculated as phosphorus; the converted product being selected from the group consisting of a fluidity starch prepared by acid- or enzyme-conversion, an oxidized starch prepared by treatment with less than about 5.5% active chlorine, and a dextrin having a calcium chloride water fluidity of less than 50; the starch being pregelatinized before or after modification of the starch; the treatment percentages being by weight based on the starch.

20. The product of claim 19, wherein the mixture is about 50–75% of the caseinates and about 50–25% of the starch, wherein the starch-caseinate mixture comprises about 20–30% by weight of the total cheese product, and wherein the ratio of sodium to calcium caseinate is about 10–90:90–10.

21. An imitation cheese product, which is functionally equivalent to a caseinate-based imitation cheese product selected from the group consisting of mozzarella cheese, cheddar cheese, and processed American cheese, which consists essentially of water, an edible vegetable fat or vegetable oil, cheese additives, and a mixture of about 20–80% by weight of sodium and calcium caseinate and about 80–20% by weight of a mixture of (a) an edible pregelatinized modified or unmodified starch having an amylose content of at least 40% by weight with up to 80% by weight of (b) an edible pregelatinized modified or unmodified starch having an amylose content of 0–40% by weight; the modified starch being selected from the group consisting of a derivatized starch, a converted starch, a converted and derivatized starch, and a crosslinked starch; the derivatized starch being prepared by treatment of the starch with up to about 25% propylene oxide, up to about 5% succinic anhydride, up to about 10% octenylsuccinic anhydride, or a sufficient amount of acetic anhydride to provide a maximum of about 6% bound acetyl, or a sufficient amount of sodium or potassium orthophosphate, sodium or potassium tripolyphosphate, or mixtures thereof to provide a maximum of about 0.8% bound phosphate, calculated as phosphorus; the converted product being selected from the group consisting of a fluidity starch prepared by acid- or enzyme-conversion of the starch, an oxidized starch prepared by treatment of the starch with less than about 5.5% active chlorine, and a dextrin having a calcium chloride water fluidity of less than about 50 prepared by pyrodextrinization of the starch; the starch being pregelatinized before or after modification of the starch; the treatment percentages being by weight based on the starch.

22. The product of claim 21, wherein the mixture of (a) with (b) is about 70–30% of (a) with about 30–70% of (b) and wherein (a) is a pregelatinized unmodified starch having an amylose content of about 50–70%.

23. The product of claim 22, wherein starch (a) is a jet-cooked or a jet-cooked/spray-dried unmodified starch having an amylose content of about 50% and (b) is a pregelatinized 50 WF Amioca starch having little or no amylose.

* * * * *